United States Patent
Hein et al.

(10) Patent No.: US 10,741,163 B2
(45) Date of Patent: Aug. 11, 2020

(54) NOISE-CANCELLATION SYSTEMS AND METHODS

(71) Applicant: Bose Corporation, Framingham, MA (US)

(72) Inventors: Travis Hein, Holliston, MA (US); Siamak Farahbakhsh, Waltham, MA (US); Eric Bernstein, Cambridge, MA (US)

(73) Assignee: Bose Corporation, Framingham, MA (US)

( * ) Notice: Subject to any disclaimer, the term of this patent is extended or adjusted under 35 U.S.C. 154(b) by 0 days.

(21) Appl. No.: 16/176,871

(22) Filed: Oct. 31, 2018

(65) Prior Publication Data

US 2020/0135162 A1    Apr. 30, 2020

(51) Int. Cl.
| | |
|---|---|
| *G10K 11/178* | (2006.01) |
| *B60W 40/06* | (2012.01) |
| *G10K 11/00* | (2006.01) |

(52) U.S. Cl.
CPC ....... *G10K 11/17825* (2018.01); *B60W 40/06* (2013.01); *G10K 11/002* (2013.01);
(Continued)

(58) Field of Classification Search
CPC ....... G10K 11/17825; G10K 11/17854; G10K 11/002; G10K 2210/1282;
(Continued)

(56) References Cited

U.S. PATENT DOCUMENTS

| | | | | |
|---|---|---|---|---|
| 4,258,421 A | * | 3/1981 | Juhasz | .......... G07C 5/085 340/870.16 |
| 4,364,343 A | * | 12/1982 | Malik | .......... F02D 41/042 123/179.16 |

(Continued)

FOREIGN PATENT DOCUMENTS

JP    H09218687 A1 *  8/1997

OTHER PUBLICATIONS

International Search Report and the Written Opinion of the International Searching Authority, International Application No. PCT/US2019/058777, pp. 1-13, dated Mar. 23, 2020.

*Primary Examiner* — Davetta W Goins
*Assistant Examiner* — Kuassi A Ganmavo
(74) *Attorney, Agent, or Firm* — Bond, Schoeneck & King, PLLC

(57) ABSTRACT

A road noise-cancellation system, comprising: an actuator disposed in a vehicle cabin; a controller comprising a processor and non-volatile memory, the controller being programmed to: generate a noise-cancellation signal with a noise-cancellation filter including a first plurality of coefficients, the noise-cancellation signal being based on the first plurality of coefficients, the noise-cancellation signal being transduced by the actuator to generate a noise-cancellation audio signal based on the noise-cancellation signal, the noise-cancellation audio signal destructively interfering with an undesired noise in a noise-cancellation zone; adjust the first plurality of coefficients of the noise-cancellation filter based on one or more input signals to provide a second plurality of coefficients; store the second plurality of coefficients in the non-volatile memory during a shutdown sequence or at the end of an interval; and restore the second plurality of coefficients from non-volatile memory to the noise-cancellation filter after (i) startup or (ii) determining (Continued)

that a third plurality of coefficients, provided by a second adjustment, are divergent or unstable.

15 Claims, 3 Drawing Sheets

(52) U.S. Cl.
CPC ............... *G10K 11/17854* (2018.01); *G10K 2210/1282* (2013.01); *G10K 2210/3018* (2013.01); *G10K 2210/3026* (2013.01)

(58) Field of Classification Search
CPC .. G10K 2210/3018; G10K 2210/3026; B60W 40/06
See application file for complete search history.

(56) References Cited

U.S. PATENT DOCUMENTS

| | | | |
|---|---|---|---|
| 5,758,311 A * | 5/1998 | Tsuji | G10K 11/178 701/111 |
| 9,058,801 B2 | 6/2015 | Po et al. | |
| 2005/0053244 A1* | 3/2005 | Onishi | G10K 11/17883 381/71.11 |
| 2011/0142248 A1* | 6/2011 | Sakamoto | G10K 11/178 381/71.4 |
| 2013/0200690 A1* | 8/2013 | Rini | H02J 7/0031 307/9.1 |
| 2014/0072134 A1* | 3/2014 | Po | G10K 11/178 381/71.11 |
| 2014/0286500 A1* | 9/2014 | Iwamoto | G05D 19/02 381/71.4 |
| 2015/0365761 A1* | 12/2015 | Alderson | G10K 11/178 381/71.6 |
| 2016/0196819 A1 | 7/2016 | Wurtz | |
| 2016/0300559 A1* | 10/2016 | Lee | G10K 11/178 |
| 2018/0268803 A1* | 9/2018 | Pfaffinger | G10K 11/178 |
| 2018/0286378 A1* | 10/2018 | Shinno | G10K 11/17881 |
| 2019/0103090 A1* | 4/2019 | Cho | G10K 11/178 |

* cited by examiner

NOISE-CANCELLATION SYSTEMS AND METHODS

BACKGROUND

The present disclosure generally relates to noise-cancellation systems and methods.

SUMMARY

All examples and features mentioned below can be combined in any technically possible way.

According to an aspect, a road noise-cancellation system includes: an actuator disposed in a vehicle cabin; a controller comprising a processor and non-volatile memory, the controller being programmed to: generate a noise-cancellation signal with a noise-cancellation filter including a first plurality of coefficients, the noise-cancellation signal being based on the first plurality of coefficients, the noise-cancellation signal being transduced by the actuator to generate a noise-cancellation audio signal based on the noise-cancellation signal, the noise-cancellation audio signal destructively interfering with an undesired noise in a noise-cancellation zone; adjust the first plurality of coefficients of the noise-cancellation filter based on one or more input signals to provide a second plurality of coefficients; store the second plurality of coefficients in the non-volatile memory during a shutdown sequence or at the end of an interval; and restore the second plurality of coefficients from non-volatile memory to the noise-cancellation filter after (i) startup or (ii) determining that a third plurality of coefficients, provided by a second adjustment, are divergent or unstable.

According to an embodiment, the step of restoring the second plurality of coefficients comprises loading the second plurality of coefficients from non-volatile memory into volatile memory.

According to an embodiment, the interval is periodic.

According to an embodiment, the length of the interval is determined according to the road conditions.

According to an embodiment, the second plurality of coefficients are only stored when the second plurality of coefficients are determined to be stable.

According to an embodiment, the shutdown sequence is initiated by a user turning a key and persists for a predetermined period of time thereafter.

According to an embodiment, the first plurality of coefficients are adjusted according to an adaptive processing module.

According to an embodiment, the one or more input signals are a noise sensor signal from a noise sensor and an error sensor signal from an error sensor.

According to an embodiment, the coefficients are adjusted at least in part to minimize the error sensor signal.

According to an embodiment, the error sensor is a microphone disposed within the vehicle cabin.

According to another aspect, a method for persistently storing the last state of a road noise cancellation system, includes the steps of: generating a noise-cancellation signal with a noise-cancellation filter including a first plurality of coefficients, the noise-cancellation signal being based on the first plurality of coefficients, the noise-cancellation signal being transduced by an actuator to generate a noise-cancellation audio signal based on the noise-cancellation signal, the noise-cancellation audio signal destructively interfering with an undesired noise in a noise-cancellation zone; adjusting the first plurality of coefficients of the noise-cancellation filter based on one or more input signals to provide a second plurality of coefficients; storing the second plurality of coefficients in the non-volatile memory during a shutdown sequence or at the end of an interval; and restoring the second plurality of coefficients from non-volatile memory to the noise-cancellation filter after (i) startup or (ii) determining that a third plurality of coefficients, provided by a second adjustment, are divergent or unstable.

According to an embodiment, the step of restoring the second plurality of coefficients comprises loading the second plurality coefficients from non-volatile memory into volatile memory.

According to an embodiment, the interval is periodic.

According to an embodiment, the length of the interval is determined according to the road conditions.

According to an embodiment, the second plurality of coefficients are only stored when the second plurality of coefficients are determined to be stable.

According to an embodiment, the shutdown sequence is initiated by a user turning a key and persists for a predetermined period of time thereafter.

According to an embodiment, the first plurality of coefficients are adjusted according to an adaptive processing module.

According to an embodiment, the one or more input signals are a noise sensor signal from a noise sensor and an error sensor signal from an error sensor.

According to an embodiment, the first plurality of coefficients are adjusted at least in part to minimize the error sensor signal.

According to an embodiment, the error sensor is a microphone disposed within a vehicle cabin.

The details of one or more implementations are set forth in the accompanying drawings and the description below. Other features, objects, and advantages will be apparent from the description and the drawings, and from the claims.

DETAILED DESCRIPTION

Road noise-cancellation methods typically employ an adaptive algorithm that adjusts the coefficients of a noise-cancellation filter according to the changing behavior of the nonlinear vehicle response to road input. The adaptive algorithm thus adjusts the noise-cancellation filter coefficients to better match the changing response of the vehicle, resulting in improved noise-cancellation over time.

These coefficients, however, are lost upon shutdown of the vehicle (and, consequently, shutdown of the controller implementing the road noise-cancellation). As a result, the vehicle restarts into a default setting, requiring time to readjust from the default setting to the behavior of the vehicle as it travels on the road surface, thus lengthening the time to peak performance.

Similarly, if the coefficients of the noise-cancellation filter result in the noise-cancellation filter being unstable or divergent, restoring the coefficients to a default setting will require a lengthy adaptation time.

Various embodiments disclosed herein are directed to systems and methods for persistently storing the last state of the coefficients of a noise-cancellation filter through a power cycle. This may be accomplished by storing the last state of the coefficients in non-volatile memory prior to the shutdown of the controller implementing the noise-cancellation filter and by restoring the last state of the coefficients after startup of the controller.

Figure 1:
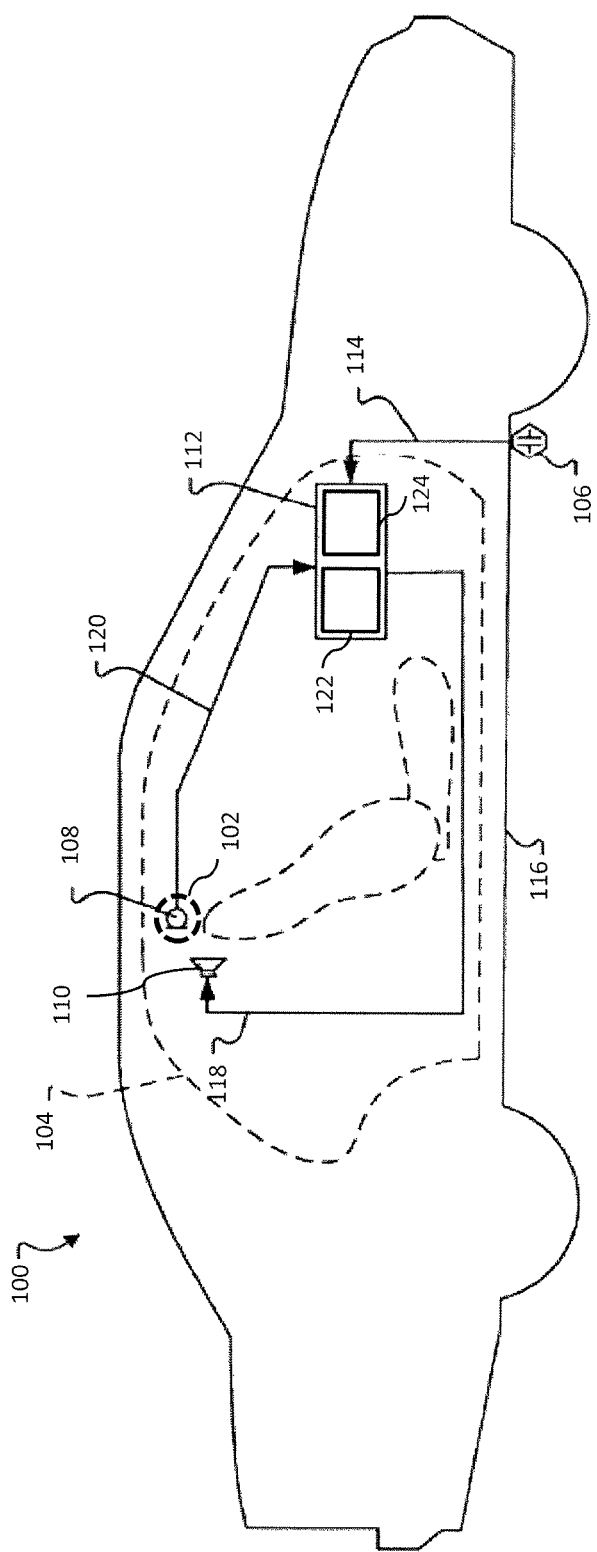
FIG. 1 is a schematic of a noise-cancellation system according to an embodiment.

FIG. 1 is a schematic view of a noise-cancellation system 100 configured to destructively interfere with undesired sound in at least one cancellation zone 102 within a predefined volume 104 such as a vehicle cabin. At a high level, an embodiment of noise-cancellation system 100 may include a noise sensor 106, an error sensor 108, an actuator 110, and a controller 112.

In an embodiment, noise sensor 106 is configured to generate noise signal(s) 114 representative of the undesired sound, or a source of the undesired sound, within predefined volume 104. For example, as shown in FIG. 1, noise sensor 106 may be an accelerometer mounted to and configured to detect vibrations transmitted through a vehicle structure 116. Vibrations transmitted through the vehicle structure 116 are transduced by the structure into undesired sound in the vehicle cabin (perceived as a road noise), thus an accelerometer mounted to the structure provides a signal representative of the undesired sound Actuator 110 may, for example, be speakers distributed in discrete locations about the perimeter of the predefined volume. In an example, four or more speakers may be disposed within a vehicle cabin, each of the four speakers being located within a respective door of the vehicle and configured to project sound into the vehicle cabin. In alternate embodiments, speakers may be located within a headrest, or elsewhere in the vehicle cabin.

A noise-cancellation signal 118 may be generated by controller 112 and provided to one or more speakers in the predefined volume, which transduce the noise-cancellation signal 118 to acoustic energy (i.e., sound waves). The acoustic energy produced as a result of noise-cancellation signal 118 is approximately 180° out of phase with—and thus destructively interferes with—the undesired sound within the cancellation zone 102. The combination of sound waves generated from the noise-cancellation signal 118 and the undesired noise in the predefined volume results in cancellation of the undesired noise, as perceived by a listener in a cancellation zone.

Because noise-cancellation cannot be equal throughout the entire predefined volume, noise-cancellation system 100 is configured to create the greatest noise cancellation within one or more predefined cancellation zones 102 with the predefined volume. The noise-cancellation within the cancellation zones may effect a reduction in undesired sound by approximately 3 dB or more (although in varying embodiments, different amounts of noise-cancellation may occur). Furthermore, the noise-cancellation may cancel sounds in a range of frequencies, such as frequencies less than approximately 350 Hz (although other ranges are possible).

Error sensor 108, disposed within the predefined volume, generates an error sensor signal 120 based on detection of residual noise resulting from the combination of the sound waves generated from the noise-cancellation signal 118 and the undesired sound in the cancellation zone. The error sensor signal 120 is provided to controller 112 as feedback, error sensor signal 120 representing residual noise uncancelled by the noise-cancellation signal. Error sensors 108 may be, for example, at least one microphone mounted within a vehicle cabin (e.g., in the roof, headrests, pillars, or elsewhere within the cabin).

It should be noted that the cancellation zone(s) may be positioned remotely from error sensor 108. In this case, the error sensor signal 120 may be filtered to represent an estimate of the residual noise in the cancellation zone(s). In either case, the error signal will be understood to represent residual undesired noise in the cancellation zone.

In an embodiment, controller 112 may comprise a non-transitory storage medium 122 and processor 124. In an embodiment, non-transitory storage medium 122 may store program code that, when executed by processor 124, implements the various filters and algorithms described in connection with FIGS. 2-3. Non-transitory storage medium 122 may be comprised of non-volatile memory such as a solid-state drive or hard disk. In an embodiment, during operation, program code and other stored information may be loaded from non-volatile memory into volatile memory, which provides greater speed for performing the operations and calculations necessary for noise-cancellation. It is, however, appreciated that later-developed forms of non-volatile memory could offer speeds sufficient to render loading data into volatile memory unnecessary, in which case only the non-volatile memory may be implemented. Controller 112 may be implemented in hardware and/or software. For example, controller may be implemented by a DSP, an FPGA, an ASIC, or other suitable hardware.

Although the non-transitory storage medium 122 is shown in FIG. 1 disposed within controller 112, it should be understood that the non-transitory storage medium 122 may be located outside of controller 112, as long as it is in communication with controller 112 in a manner sufficient to load program code and store coefficient values necessary for the systems and methods shown and described in connection with FIGS. 2-3. It should also be understood that the non-volatile memory may be separate from the non-transitory storage medium 122 to the extent that different memories may be used to store different values and perform different functions. The non-transitory storage medium 122 is merely provided as an example of a non-volatile memory that could be used to store the last state of the filter coefficients.

Figure 2:
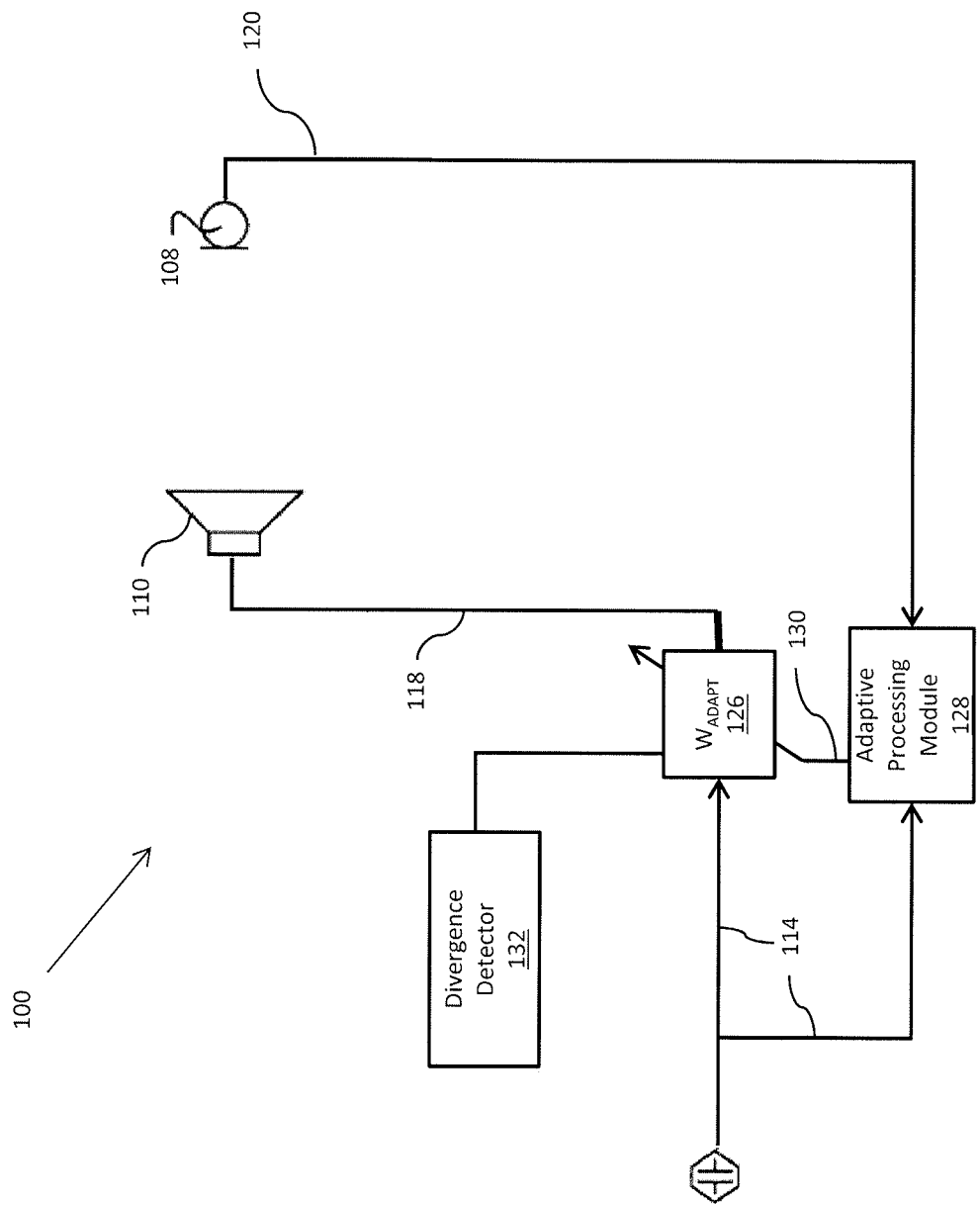
FIG. 2 is a schematic of a noise-cancellation system according to an embodiment.

Turning to FIG. 2, there is shown a block diagram of an embodiment of noise-cancellation system 100, including a plurality of filters implemented by controller 112 (FIG. 1). As shown, controller may define a control system including $W_{adapt}$ filter 126, adaptive processing module 128, and divergence detector 132.

$W_{adapt}$ filter 126 is configured to receive the noise signal 114 from noise sensor 106 and to generate noise-cancellation signal 118. Noise-cancellation signal 118, as described above, is input to actuator 110 where it is transduced into the noise-cancellation audio signal that destructively interferes with the undesired sound in the predefined cancellation zone 102. Wadapt filter 126 may be implemented as any suitable linear filter, such as a multi-input multi-output (MIMO) finite impulse response (FIR) filter. $W_{adapt}$ filter 126 employs a set of coefficients which define the noise-cancellation signal 118 and which may be adjusted to adapt to changing behavior of the nonlinear vehicle response to road input (or to other inputs in non-vehicular noise-cancellation contexts). The $W_{adapt}$ filter 126 filter coefficients may be, at the start, default coefficients that are either set during manufacture (i.e., factory settings) or are set at some later time (e.g., during an update). But as the vehicle is driven, the coefficients are adjusted from the default coefficients to coefficients that produce a noise-cancellation signal that better cancels the undesired noise.

The adjustments to the coefficients may be performed by an adaptive processing module 128 that receives as inputs the error sensor signal 120 and the noise signal 114 and, using those inputs, generates a filter update signal 130. The filter update signal 130 is an update to the filter coefficients implemented in $W_{adapt}$ filter 126. The noise-cancellation signal 118 produced by the updated $W_{adapt}$ filter 126 will minimize error signal 120, and, consequently, the undesired noise in the cancellation zone.

Controller 112 may also include a divergence detector 132 configured to perform a qualitative analysis on the coefficients of $W_{adapt}$ filter 126 to determine whether the coefficients are diverging or are unstable. Various methods and algorithms for determining instability or divergence are known in the art and may be implemented by divergence detector 132 to determine the quality of the coefficients. It should be understood that, although divergence detector 132 is shown to be in communication with $W_{adapt}$ filter 126, divergence detector 132 may alternatively be in communication with adaptive processing module 128 and determine whether the update to the coefficients (rather than the currently-implemented coefficients) is divergent or unstable.

Upon shutdown of a vehicle (e.g., when a user turns the key), the vehicle will begin a shutdown sequence that typically involves, among other things, powering down controller 112. During this shutdown procedure (occurring, for example, during a particular defined period of time, such as ten seconds after the key is turned), controller 112 may be configured to store the last-state of the coefficients in non-volatile memory, such as non-transitory storage medium 122, and to restore the coefficients into $W_{adapt}$ filter 126 after startup. Because the road conditions, and the vehicle response to those conditions, will likely be unchanged (or at least very similar) between shutdown and startup, the restored coefficients will likely serve to produce a noise-cancellation signal that better cancels undesired noise than a given set of default coefficients.

It should be understood that the above-described noise-cancellation system is merely provided as an example, and that any noise-cancellation system (e.g., feedforward or feedback systems) employing an adaptive filter and for which coefficients, representing the last-state of the filter may be used.

Figure 3:
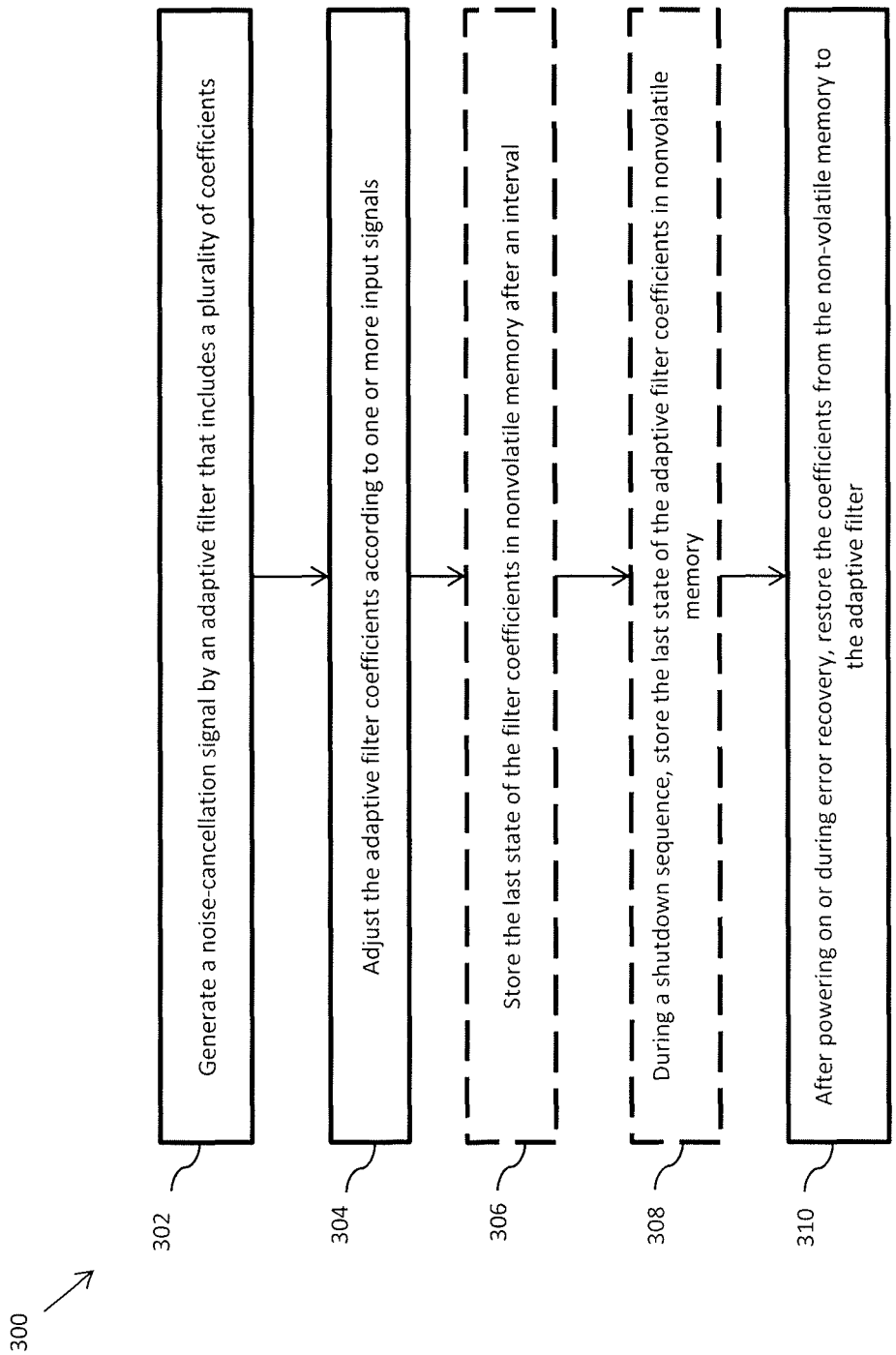
FIG. 3 is a flowchart of a method for persistently storing the last state of a noise-cancellation method according to an embodiment.

Method 300 shown in FIG. 3 depicts an example last-state persistent storage sequence. Method 300 may be implemented using a noise-cancellation system such as noise-cancellation system described in connections with FIGS. 1 and 2.

At step 302 a noise-cancellation signal is generated by an adaptive filter that includes a first plurality of coefficients, such as $W_{adapt}$ filter 126. The noise-cancellation signal is based on the coefficients of the adaptive filter. The adaptive filter may be implemented by a controller such as a controller 112 (FIG. 1) that includes non-volatile memory, such as a non-transitory storage medium 122 (FIG. 1).

As shown, at step 304, the adaptive filter coefficients (i.e., the first plurality of filter coefficients) are adjusted according to one or more input signals. The input signals may be from, for example, a noise sensor, such as noise sensor 106, which is configured to generate noise signal(s) 114 representative of the undesired sound, or a source of the undesired sound, within predefined volume 104. For example, as shown in FIG. 1, noise sensor 106 may be an accelerometer mounted to and configured to detect vibrations transmitted through a vehicle structure 116. The input signals may also be from an error sensor, such as error sensor 108, which may be implemented as a microphone disposed within the vehicle cabin. Error sensor may generate an error signal representing residual noise uncancelled by the noise-cancellation signal. The adaptive filter coefficients may be adjusted, at least in part, to minimize the error signal.

At step 306, the updated coefficients (i.e., a second plurality of filter coefficients) are stored in non-volatile memory. The updated coefficients may be stored in non-volatile memory at the end of an interval. The length of the interval may be any suitable length of time (e.g., every 10 seconds, every 20 seconds, etc.)—shorter intervals likely store coefficients that more accurately reflect the current road conditions, while longer intervals require less processing resources.

Furthermore, while, in one embodiment, the interval may be periodic, in alternate embodiments the length of the interval may be varied according to the processing resources available (e.g., the updated coefficients may be stored more frequently when lower processing demands are made upon controller 112) or according to the demands placed upon noise-cancellation system 100 by the road conditions. In the latter example, frequently varying road-conditions may require storing the coefficients more frequently to ensure that the coefficients, when restored, accurately reflect coefficients derived from the most-recent road conditions, while more constant road conditions (e.g., highway driving) may only require infrequent storage of the coefficients. The length of the interval of time may, for example, be based on the average difference in magnitude of the coefficients from update to update.

Regardless of the length of the interval, the updated coefficients may be stored only if, for example, the updated coefficients are sufficiently stable and convergent. Stability or convergence of the updated coefficients may be determined by a divergence detector (such as divergence detector 132) according to various methods known in the art. Thus, if the divergence detector determines that the updated coefficients are stable, the updated coefficients are stored in non-volatile memory to ensure that any restored coefficients from non-volatile memory are stable and convergent. Whether the updated coefficients are stable may be determined by whether the output of the divergence detector exceeds or falls below a particular threshold. The threshold may be tailored to ensure that the updated coefficients are only stored in non-volatile memory when the output of the divergence detector reflects a high degree of confidence that updated coefficients are stable. Thus, the updated coefficients may, in an embodiment, not be stored at the end of the interval if the output of the divergence detector reflects either a low confidence that the updated coefficients are stable or reflects that the updated coefficients are diverging (whether the coefficients are diverging may, for example, be determined by applying a different threshold to the output of the divergence detector.)

In the event that divergence detector detects that the updated coefficients are unstable or divergent, the controller may enter an error recovery state, which comprises restoring the most-recently stored stable and convergent coefficients from non-volatile memory. Again, whether the updated coefficients are unstable or divergent may be determined by comparing the output of the divergence detector to a threshold. The threshold may be tailored, for example, to reflect a high degree of confidence that the coefficients are diverging.

In sum, two thresholds may be applied to the output of the divergence detector: a first threshold that represents a high degree of confidence that the updated coefficients are stable, and a second threshold that represents a high degree of confidence that the updated coefficients are diverging. Output values between the first and second thresholds may represent low confidence of either stability or divergence. Thus, by comparing the output of the divergence detector against the first and second thresholds, the updated coefficients may be determined to be stable with high confidence, stable or divergent with low confidence, or divergent with high confidence. The controller may be configured to only store the updated coefficients at step 308 when the output value reflects a high confidence of stability, to enter an error recovery state at step 310 (discussed below) when the output value reflects a high confidence of divergence, and to neither store nor enter error recovery for low confidence outputs. In an alternate embodiment, the first and second threshold may be set to be equal, thus eliminating the low confidence state and resulting in a two-state system that either stores the updated coefficients or enters error recovery depending on the output of the divergence detector.

It should, however, also be understood that there are varying methods for determining stability or convergence, which do not necessarily require thresholding an output value of the divergence detector.

Furthermore, the controller may alternatively enter an error recovery state in the event an unexpected power cycle or other error that prevents controller from properly functioning.

In an alternate embodiment, instead of storing the updated coefficients at the end of an interval (periodic or otherwise) in non-volatile memory, the updated coefficients may be stored in volatile memory, since the error recovery may not necessarily require power to be cycled. Thus, the controller may temporarily store convergent and stable updated coefficients in volatile memory to replace future coefficients in the event of error recovery.

At step 308, a shutdown sequence is initiated by a user or by some other event, such as a safety sequence that causes the vehicle to shut down. Before the controller is powered down, the controller stores the last-state of the adaptive filter coefficient values in the non-volatile memory, so that the values of the last state of the coefficients will persist through the power cycle. Like step 306, the controller may, in an embodiment, only store the updated coefficients at step 308 if the output of the divergence detector reflects a high degree of confidence that the coefficients are stable. This may be accomplished by comparing the output of the divergence detector against a threshold, although other methods are contemplated.

Steps 306 and 308 are depicted in dashed lines in FIG. 3 because they may be implemented in alternate embodiments or within the same system. Furthermore, step 308 may be omitted when the controller enters an error recovery state, which likely occurs without an intervening shutdown sequence.

At step 310, after the vehicle is restarted and the controller is powered on, or during error recovery, the controller will restore the second plurality of filter coefficients from non-volatile memory to the adaptive filter, which is then used to again begin generating noise-cancellation signal. In an alternate embodiment, controller may start the adaptive filter with the default coefficients and replace them with the coefficients loaded from non-volatile memory. In either case, depending on the speed of the non-volatile memory, step 308 may require loading the coefficients from non-volatile memory into volatile memory, or it may be sufficient to refer to the memory locations in non-volatile memory without loading into volatile memory.

As a result of using the stored updated coefficients, the time to peak performance of adaptive filter is shortened. As the adaptive filter would otherwise require time to adapt from the default coefficients to the behavior of the vehicle as it travels on the road surface, storing the coefficients reduces the likelihood of adaptation at startup or at error recovery and provides high performance sooner. Because the disclosed systems and methods allow for the improved performance (e.g., faster time to adapt after startup) of a noise-cancellation system, these systems and methods represent an improvement to the functioning of a computer.

The functionality described herein, or portions thereof, and its various modifications (hereinafter "the functions") can be implemented, at least in part, via a computer program product, e.g., a computer program tangibly embodied in an information carrier, such as one or more non-transitory machine-readable media or storage device, for execution by, or to control the operation of, one or more data processing apparatus, e.g., a programmable processor, a computer, multiple computers, and/or programmable logic components.

A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a network.

Actions associated with implementing all or part of the functions can be performed by one or more programmable processors executing one or more computer programs to perform the functions of the calibration process. All or part of the functions can be implemented as, special purpose logic circuitry, e.g., an FPGA and/or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Components of a computer include a processor for executing instructions and one or more memory devices for storing instructions and data.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, and/or method described herein. In addition, any combination of two or more such features, systems, articles, materials, and/or methods, if such features, systems, articles, materials, and/or methods are not mutually inconsistent, is included within the inventive scope of the present disclosure.

The invention claimed is:

1. A road noise-cancellation system, comprising:
   an actuator disposed in a vehicle cabin;
   a controller comprising a processor and non-volatile memory, the controller being programmed to:
   generate a noise-cancellation signal with a noise-cancellation filter including a first plurality of coefficients, the noise-cancellation signal being based on the first plurality of coefficients, the noise-cancellation signal being transduced by the actuator to generate a noise-cancellation audio signal based on the noise-cancellation signal, the noise-cancellation audio signal destructively interfering with an undesired noise in a noise-cancellation zone;
   adjust the first plurality of coefficients of the noise-cancellation filter based on one or more input signals to provide a second plurality of coefficients;
   store the second plurality of coefficients in the non-volatile memory at the end of an interval, wherein the length of the interval is determined according to the road conditions; and
   restore the second plurality of coefficients from non-volatile memory to the noise-cancellation filter after determining that a third plurality of coefficients, provided by a second adjustment, are divergent or unstable.

2. The road noise-cancellation system of claim 1, wherein the step of restoring the second plurality of coefficients comprises loading the second plurality of coefficients from non-volatile memory into volatile memory.

3. The road noise-cancellation system of claim 1, wherein the second plurality of coefficients are only stored when the second plurality of coefficients are determined to be stable.

4. The road noise-cancellation system of claim 1, wherein the shutdown sequence is initiated by a user turning a key and persists for a predetermined period of time thereafter.

5. The road noise-cancellation system of claim 1, wherein the first plurality of coefficients are adjusted according to an adaptive processing module.

6. The road noise-cancellation system of claim 1, wherein the one or more input signals are a noise sensor signal from a noise sensor and an error sensor signal from an error sensor.

7. The road noise-cancellation system of claim 6, wherein the coefficients are adjusted at least in part to minimize the error sensor signal.

8. The road noise-cancellation system of claim 6, wherein the error sensor is a microphone disposed within the vehicle cabin.

9. A method for persistently storing the last state of a road noise cancellation system, comprising the steps of:
   generating a noise-cancellation signal with a noise-cancellation filter including a first plurality of coefficients, the noise-cancellation signal being based on the first plurality of coefficients, the noise-cancellation signal being transduced by an actuator to generate a noise-cancellation audio signal based on the noise-cancellation signal, the noise-cancellation audio signal destructively interfering with an undesired noise in a noise-cancellation zone;
   adjusting the first plurality of coefficients of the noise-cancellation filter based on one or more input signals to provide a second plurality of coefficients;
   storing the second plurality of coefficients in the non-volatile memory at the end of an interval, wherein the length of the interval is determined according to the road conditions; and
   restoring the second plurality of coefficients from non-volatile memory to the noise-cancellation filter after determining that a third plurality of coefficients, provided by a second adjustment, are divergent or unstable.

10. The method of claim 9, wherein the step of restoring the second plurality of coefficients comprises loading the second plurality coefficients from non-volatile memory into volatile memory.

11. The method of claim 9, wherein the shutdown sequence is initiated by a user turning a key and persists for a predetermined period of time thereafter.

12. The method of claim 9, wherein the first plurality of coefficients are adjusted according to an adaptive processing module.

13. The method of claim 9, wherein the one or more input signals are a noise sensor signal from a noise sensor and an error sensor signal from an error sensor.

14. The method of claim 13, wherein the first plurality of coefficients are adjusted at least in part to minimize the error sensor signal.

15. The method of claim 13, wherein the error sensor is a microphone disposed within a vehicle cabin.

* * * * *